(12) United States Patent
Fette et al.

(10) Patent No.: US 7,404,098 B2
(45) Date of Patent: Jul. 22, 2008

(54) MODEM WITH POWER MANAGER

(75) Inventors: Bruce A. Fette, Mesa, AZ (US); John T. Polson, Waddell, AZ (US); Christopher L. Woodland, Cibolo, TX (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 493 days.

(21) Appl. No.: 11/238,859

(22) Filed: Sep. 28, 2005

(65) Prior Publication Data

US 2007/0073997 A1   Mar. 29, 2007

(51) Int. Cl.
   *G06F 1/32*   (2006.01)
(52) U.S. Cl. .................. 713/324; 713/320; 713/323
(58) Field of Classification Search .......... 713/300, 713/320, 322, 323, 324; 375/219, 222
   See application file for complete search history.

(56) References Cited

U.S. PATENT DOCUMENTS

| 5,944,831 | A | * | 8/1999 | Pate et al. .................. 713/324 |
| 6,052,600 | A |   | 4/2000 | Fette et al. |
| 6,876,864 | B1 | * | 4/2005 | Chapin .................. 455/509 |
| 7,016,695 | B1 | * | 3/2006 | Bahai .................. 455/466 |
| 2003/0050055 | A1 |   | 3/2003 | Ting et al. |
| 2003/0143971 | A1 | * | 7/2003 | Hongo et al. ............... 455/313 |
| 2004/0242261 | A1 |   | 12/2004 | Fette |
| 2005/0108382 | A1 |   | 5/2005 | Murotake et al. |
| 2005/0124330 | A1 | * | 6/2005 | Hong et al. .................. 455/418 |

* cited by examiner

*Primary Examiner*—Dennis M. Butler
(74) *Attorney, Agent, or Firm*—Jordan M. Meschkow; Lowell W. Gresham; Charlene R. Jacobsen (57) ABSTRACT

A programmable modem (20) for processing a waveform includes a general purpose processor (GPP) engine (34) and special purpose programmable signal processing engines (22) in communication with the GPP engine (34). Each of the special purpose engines (22) executes a special purpose software program (80) to process a portion of the waveform under one of a plurality of communications standards in response to control signals from the GPP engine (34). A power manager engine (56) is in communication with the GPP engine (34) and the signal processing engines (22). The power manager engine (56) responds to the control signals from the GPP engine (34) to power currently used ones of the special purpose engines (22) and to discontinue power to unused ones of the special purpose engines (22). The programmable modem is implemented on a single CMOS integrated circuit (66).

20 Claims, 5 Drawing Sheets

MODEM WITH POWER MANAGER

TECHNICAL FIELD OF THE INVENTION

The present invention relates to the field of radio communications. More specifically, the present invention relates to a programmable modem for use in a software defined radio that incorporates a power manager.

BACKGROUND OF THE INVENTION

Conventional radios and other communication devices communicate by generating and receiving a waveform that is fixed through the lifetime of the radio in accordance with one of several communications standards. The various communications standards are not necessarily compatible with one another, leading to situations in which some communication devices are unable to communicate with other such devices. By way of example, many of the cellular telephones used in Europe function according to a communications standard known as the Global System for Mobile Communications (GSM), based on Time Division Multiple Access (TDMA) technology. In contrast, many cellular telephones used in North America function according to communications standards based on Code Division Multiple Access (CDMA) technology. These communications standards are incompatible. Therefore, cellular telephones purchased in North America are often unusable in Europe, and vice versa.

Other exemplary situations arise between the radio equipment of first responder and public safety communities, government agencies, and the military. Frequently, existing communications systems operated by these various agencies do not allow interoperability of the communication equipment. Indeed, it is known that first responders and public safety officers have had great difficulty communicating with each other in emergency situations due to use of such non-interoperable communication equipment. This has led to inefficient communication and miscommunication between the various agencies with grave consequences.

Software defined radios (SDR) have been developed in an attempt to address the problems of incompatible communications standards. An SDR system is a radio communication system which uses software for the modulation and demodulation of radio signals, i.e., waveforms. The hardware of a software-defined radio typically includes a superheterodyne analog radiofrequency (RF) front end that boosts incoming RF signal strength and converts it to a constant frequency, analog to digital and digital to analog converters which are used to convert a digitized signal to and from analog form, and a modem digital signal processor that impresses the digital waveform onto an RF carrier or separates the digital waveform from the RF carrier.

The most significant asset of SDR is versatility. Theoretically, a single SDR set with an all-inclusive software repertoire can be used in any mode, anywhere in the world. Changing the service type, the mode, and/or the modulation protocol involves simply selecting and launching the requisite computer program, and making sure the batteries are adequately charged if portable operation is contemplated. Consequently, software defined radios have significant utility for the military and cellular telephone services, both of which must serve a wide variety of evolving radio communications standards in real time. However, a single SDR could ultimately be capable of playing the roles of cordless telephone, cellular telephone, wireless fax, wireless e-mail system, pager, wireless videoconferencing unit, wireless Web browser, Global Positioning System unit, and other evolving functions.

Many software defined radios are built from a large number of chips in order to provide an adequate range of flexible resources to anticipate all the requirements of the variety of communications standards. This large number of chips leads to an SDR that is both bulky and expensive to manufacture.

Other prior art software defined radios include a general purpose processor (GPP), a digital signal processor (DSP), and a field programmable gate array (FPGA) as a modem resource. The FPGA is programmed to perform the high speed signal processes which are too fast to be performed in the DSP or the GPP. The FPGA also includes the glue logic (simple logic circuits used to connect complex logic circuits together) and performs timing of time slotted communications standards.

This SDR configuration reduces the number of chips relative to prior art SDRs, thereby reducing bulk. Unfortunately, FPGAs are very expensive and generally slower than their application-specific integrated circuit (ASIC) counterparts and draw more power. In addition, FPGAs generate undesirably high direct current (DC) leakage current, which is used to remember the circuit topology of the FPGA. Thus, battery lifetime for many applications may be inadequate.

Accordingly, what is needed is a modem resource for communications devices, such as a software defined radio, that is capable of processing multiple waveforms inexpensively and efficiently.

SUMMARY OF THE INVENTION

Accordingly, it is an advantage of the present invention that a programmable modem is provided.

It is another advantage of the present invention that a programmable modem is provided that can process multiple waveforms under a variety of communications standards.

Another advantage of the present invention is that a programmable modem is provided that utilizes power efficiently, is cost effective to manufacture, and has a small form factor.

The above and other advantages of the present invention are carried out in one form by a programmable modem for processing a waveform. The programmable modem includes a processor and programmable signal processing engines in communication with the processor. Each of the signal processing engines is configured to execute a software program to process a portion of the waveform under one of a plurality of communication standards in response to control signals from the processor. A power manager is in communication with the processor and the programmable signal processing engines. The power manager responds to the control signals from the processor to selectively power ones of the programmable signal processing engines.

The above and other advantages of the present invention are carried out in another form by a programmable modem for processing a waveform. The programmable modem includes a processor and special purpose programmable signal processing engines in communication with the processor. Each of the signal processing engines is configured to execute a special purpose software program for implementing a particular waveform signal process to process a portion of the waveform under one of a plurality of communication standards in response to control signals from the processor. A power manager is in communication with the processor and the engines. The power manager includes means for providing power to currently used ones of the engines and discontinuing power to currently unused ones of the engines in response to the control signals from the processor.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

In accordance with the principles of the present invention, there is provided a programmable modem the can be programmed to implement multiple wireless communications standards, services, and applications. The programmable modem is particularly suitable for implementation within a software defined radio (SDR) architecture. However, the present invention is not limited to SDR. Alternatively, programmable modem may be adapted for use within a wireline modem system, and/or for other signal processing activities, such as image coding, speech coding, and the like.

Figure 1:
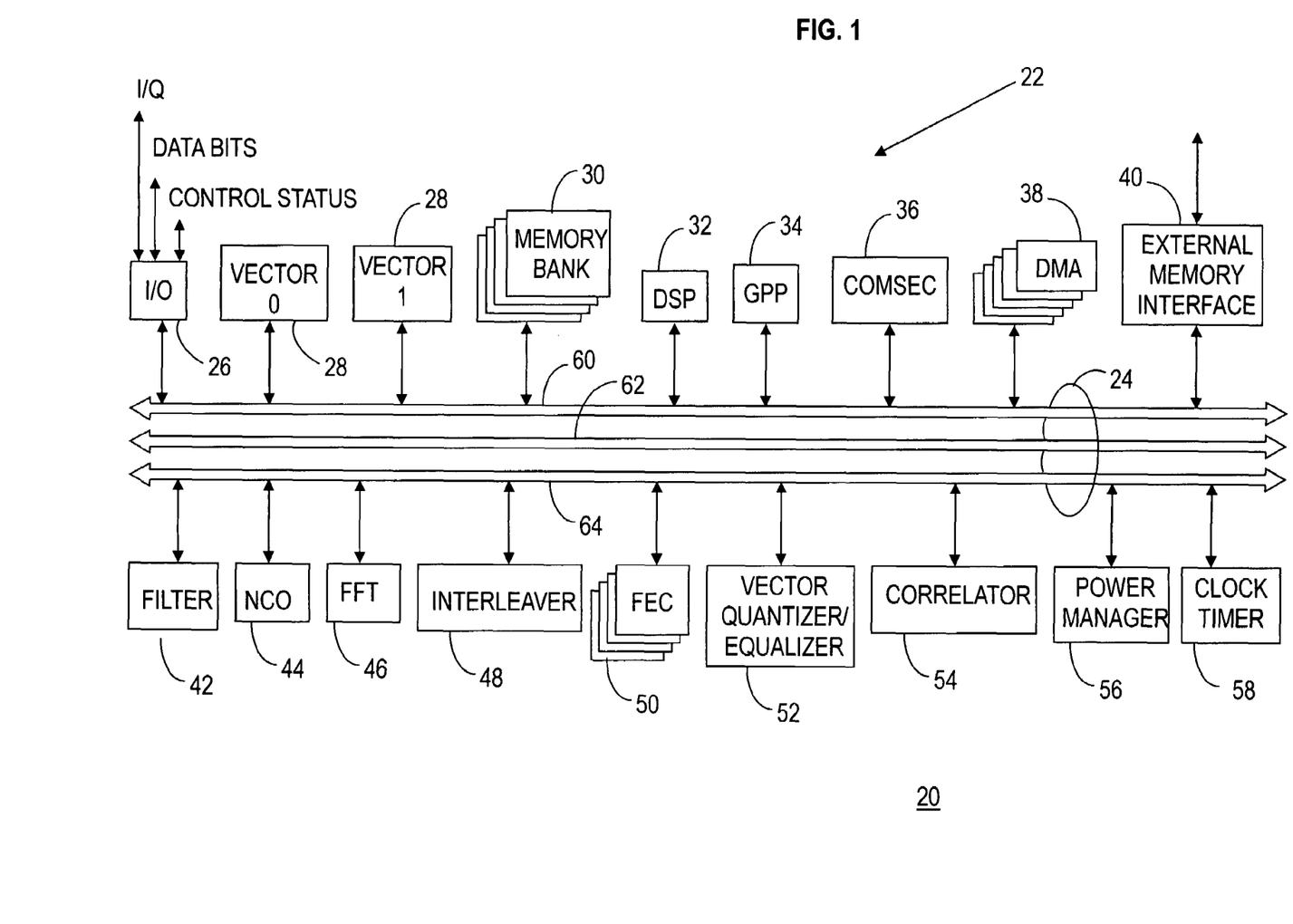
FIG. 1 shows a block diagram of a programmable modem in accordance with a preferred embodiment of the present invention.

FIG. 1 shows a block diagram of a programmable modem 20 in accordance with a preferred embodiment of the present invention. Programmable modem 20 generally includes a plurality of digital signal processing engines 22 interconnected by a bus system 24. The term "engine" discussed herein refers to an element of hardware within programmable modem 20 that performs some particular function. Each of engines 22 may be loaded with a software program that allows engine 22 to perform its particular processing function, only the results of which are made available to selected other engines 22 or to outputs of programmable modem 20. Such a configuration allows programmable modem 20 to operate with a high degree of parallelism so as to increase the efficiency of programmable modem 20.

The reference number "22" is utilized herein to collectively refer to the digital signal processing engines that make up programmable modem 20. In a preferred embodiment of the present invention, each of engines 22 is a special purpose programmable signal processing engine that is programmed with a special purpose software program containing a particular algorithm that implements a particular waveform signal process. Advantageously, the algorithm can be reprogrammed to reflect different communications standards, evolving waveform signal processes, and the like.

Additional reference numbers utilized below distinguish the various special purpose signal processing engines 22 of programmable modem 20 from one another. It should be understood that the present invention is not necessarily limited to the particular signal processing engines discussed below. Rather, various modifications, such as the exclusion of some of the signal processing engines and/or the addition of signal processing engines not expressly listed may be made without departing from the spirit of the invention.

Programmable modem 20 may include an input/output processing engine 26, vector processing engines 28, a memory bank engine 30, a digital signal processor (DSP) engine 32, a general purpose processor (GPP) engine 34, a communications security (COMSEC) processing engine 36, a direct memory access (DMA) processing engine 38, and an external memory interface, or cache, 40. In addition, programmable modem 20 may include a filter processing engine 42, a numerically controlled oscillator (NCO) processing engine 44, a fast fourier transform (FFT) processing engine 46, an interleaver processing engine 48, a forward error correction (FEC) processing engine 50, a vector quantizer/equalizer processing engine 52, a correlator engine 54, a power manager engine 56, and a clock timer engine 58.

In general, information flows into and out of programmable modem 20 via input/output (I/O) processing engine 26. Such information includes, for example, a modulated waveform (I/Q), digital data bits, control status, and so forth. I/O processing engine 26 is the specialized element of hardware that may be programmed to function as an interface to an analog to digital and digital to analog converter, digital input and output unit, and universal asynchronous receiver/transmitter, system reference clock, and so forth. Each of vector processing engines 28 is a generalized element of hardware that may be programmed to perform simultaneous computations on elements of an array or table of data in some number of dimensions. Memory bank 30 is a logical unit of memory in programmable modem 20. DSP engine 32 is an element of hardware that may be programmed to perform generalized multiply/accumulate signal processing tasks.

GPP engine 34 is an element of hardware that may be programmed as a central or focal component in programmable modem 20 to coordinate the overall operation of the other engines 22. Engines 22 may be programmed to communicate with one another in order to be able to cooperate in processing a waveform or to run completely independently. This processing is performed under the control of GPP engine 34 which distributes work, via control signals over bus system 24, to other engines 22 and collects and/or routes results from engines 22. For example, GPP engine 34 is adapted to implement an instruction set that defines a standard for performing sequencing of a plurality of the control signals.

COMSEC engine 36 is the element of hardware that is programmed to perform communications security, i.e., measures and controls taken to deny unauthorized persons information derived from telecommunications and to ensure the authenticity of such telecommunications. Communications security includes, for example, cryptosecurity, transmission security, emission security, traffic-flow security, and physical security of signals flowing out of programmable modem 20.

DMA engine 38 is the element of hardware that may be programmed to allow certain engines 22 within programmable modem 20 to access other engines 22 for reading and/or writing independently of GPP engine 34. Upon initiation by GPP engine 34, DMA engine 38 can perform a DMA transfer by copying a block of signal data from one of engines 22 to another.

External memory interface, or cache, 40 is the element of hardware (ex. RAM memory) that may be utilized as a specialized buffer storage that is continually updated to optimize data transfers between programmable modem 20 and external system elements with different characteristics.

Filter processing engine 42 is the element of hardware that may be programmed to host a large number of filter operations. Some of the filter applications that may be implemented in filter engine 42 include, but are not limited to, a finite impulse response (FIR) filter, an infinite impulse response (IIR) filter, a cascade-integrator-comb (CIC) filter, a spreader filter, a de-spreader filter, an interpolation filter, a decimation filter, a rake filter, and so forth.

NCO processing engine 44 is the element of hardware that may be programmed to make use of the values of sine and cosine, for example, to synthesize a range of frequencies by using a lookup table. FFT engine 46 is the element of hardware that may be programmed to run large fast fourier transforms. Interleaver engine 48 is the element of hardware that may be programmed to perform interleaving tasks to interleave encoded symbols, thus yielding a form of time diversity to guard against localized corruption or bursts of errors.

FEC engine 50 is the element of hardware that may be programmed to host a number of operations that perform error control for data transmission. Some of the forward error correction applications that may be implemented in FEC engine 50 include, but are not limited to, block encoder/decoder, convolutional encoder, Viterbi decoder, Reed Solomon decoder, binary BCH (Bose, Ray-Chaudhuri, Hocquenghem) decoder, turbo encoder/decoder, low density parity check, and so forth.

Vector quantizer/equalizer engine 52 is the element of hardware that may be programmed to demodulate a waveform and/or to adaptively filter the received waveform. In particular, the vector quantizer application of engine 52 may be used as a waveform demodulator, whereas the equalizer may be used to adaptively filter the received signal to remove inter-symbol interference that was inadvertently introduced into the signal. In this exemplary embodiment, vector quantizer and equalizer applications may be contained on the same one of engines 22 because of their interdependences on each other. Combining vector quantizer and equalizer applications together on the same one of engines 22 allows the data flow to remain inside engine 52 instead of having to process the information stream between two separate engines 22.

Correlator engine 54 is the element of hardware that may be programmed to find the correlation between a signal and another signal. Clock timer engine 58 is the element of hardware that may be programmed to maintain the time of day and/or to measure the time or duration of an event or action.

In a preferred embodiment of the present invention, power manager engine 56 selectively powers engines 22 in response to control signals from GPP engine 34. Engines 22 can be powered up or powered down so that when no processing is being performed by particular ones of engines 22, no direct current (DC) power will be consumed by those currently unused ones of engines 22. By way of example, power manager engine 56 may include a control register for powering up or powering down engines 22. This can be accomplished by gating off the clock to discontinue power to currently unused groups of engines 22. Alternatively, this can be accomplished through the use of series transistors that remove power to individual ones of engines 22.

In one exemplary configuration, GPP engine 34 communicates with power manager engine as a memory mapped peripheral. Thus, GPP engine 34 can write commands to power manager engine 56, such as, power up [particular engine(s) 22] to voltage [a, b, c, . . . ]; power down [particular engine(s) 22]; enable clock to [particular engine(s) 22] at frequency [d, e, f, . . . ]; disable clock to [particular engine(s) 22]; sleep for T seconds; wakeup; and so forth.

Selective powering of currently used ones of engines 22 can achieve significant power savings over prior art devices. Reducing the load on the battery essentially extends battery life so that programmable modem 20 may be readily implemented in remote application, such as wireless devices.

Bus system 24 includes a first bus 60, a second bus 62, and a third bus 64. Each of first bus 60, second bus 62, and third bus 64 interconnect engines 22. Therefore, separate packets of information, such as control signals, instruction sets, blocks of signal data, and the like can be conveyed concurrently over first, second, and third busses 60, 62, and 64, respectively. The implementation of bus system 24 having three different busses reduces the possibility of contention when two or more engines 22 are attempting to transmit at the same time over bus system 24. GPP engine 34 may serve as a master scheduler to control information flow over bus system 24.

In an exemplary programming scenario, a waveform developer may write waveforms in a standard programming language, such as C, making a serials of calls to a variety of standard signal processing primitives. These calls may be trapped and reflected in engines 22 by a set of associated hardware drivers (not shown), thus making engines 22 transparent to the waveform developer. While another of engines 22 is running a task, GPP engine 34 is freed to perform other threads of computation. When engine 22 completes its task, the associated hardware drivers return the results to GPP engine 34 and restore the computational thread which was waiting for those results.

An exemplary generalized waveform data processing flow may entail the following operations. Analog waveform signals may arrive at I/O engine 26 where they are digitized and placed in a buffer associated with I/O processor 26. Alternatively, digitized signals may arrive at I/O processor 26 where they are received and stored in the associated buffer. GPP engine 34 services an interrupt by setting up a DMA, via DMA engine 38, to move a block of signal data to filter engine 42. Filter engine 42 may perform a CIC filter, then an FIR filter to match the signal bandwidth of the received signal. Upon completion of the filtering process, filter engine 42 signals task done.

GPP engine 34 next arranges a DMA, via DMA engine 38, to move the data to NCO engine 44 where engine 44 removes an estimated frequency offset. Upon completion, GPP engine 34 sets up a DMA, via DMA engine 38, to move the data to vector quantizer/equalizer engine 52. Upon completion of the equalize, demodulate, and update equalizer taps, GPP engine 34 sets up a DMA, via DMA engine 38, to move the resulting demodulated data bits to FEC engine 50 for error correction. Following error correction and block error correcting at FEC engine 50, GPP engine 34 sets up a DMA, via DMA engine 38, to move the demodulated bits back to GPP engine 34 to parse the message into header and data fields for eventual output from programmable modem 20.

Programmable signal processing engines 22 advantageously provide the standard signal processing capability for processing a plurality of waveforms under a number of communications standards. The special purpose engines 22 for high speed filtering, spreading, dispreading, correlation, FFT, equalization, modulation and demodulation of symbols, error correction coding and decoding, and the like may be conventional circuits, or may be designed to consume a minimal amount of DC battery power, thereby achieving further power savings over prior art devices.

Figure 2:
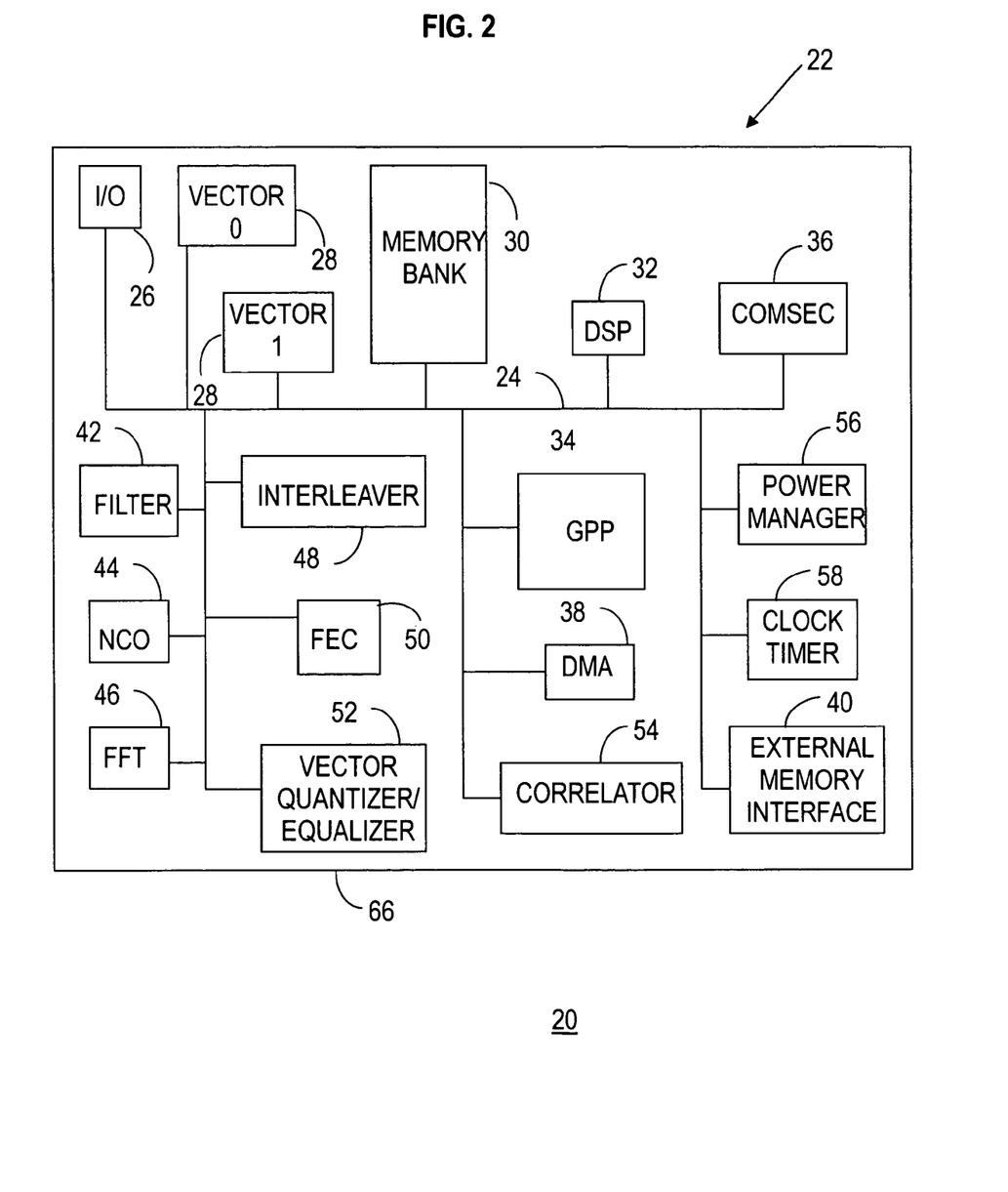
FIG. 2 shows a top schematic view the programmable modem of FIG. 1 implemented on a single complementary metal-oxide-semiconductor (CMOS) integrated circuit chip.

FIG. 2 shows a top schematic view of programmable modem 20 implemented on a single complementary metal-oxide-semiconductor (CMOS) integrated circuit chip 66. As shown, signal processing engines 22 of programmable modem 20 are laid out as blocks on CMOS chip 66 and are interconnected by bus system 24. The configuration illustrated in FIG. 2 may be implemented from the ultra large scale integration (ULSI), or combination, of many specialized computing element architectures for each of engines 22 anticipated for a broad collection of communications standards. Of course, those skilled in the art will recognize that chip 66 may be laid out in a great variety of configurations for greatest space efficiency.

A central characteristic of CMOS technology is that it only uses significant power when its transisters are switching between on and off states. Consequently, CMOS devices use little power and do not produce as much heat as other forms of logic thus achieving further savings in power consumption over prior art FPGA configurations. In addition, CMOS also allows a high density of logic functions on a chip and operates faster than other implementations of the same functionality, such as prior art FPGA configurations, thereby yielding a highly efficient programmable modem 20.

The present invention replaces the collection of many different chip types found in prior art devices with CMOS chip 66 that is architected to provide the standard signal processing engines that may be required for processing a waveform under any of a number of communications standards. Each of engines 22 may be designed to consume the least amount of silicon real estate, therefore yielding a chip having a small form factor. Consequently, radio designs utilizing CMOS chip 66 can be more cost effective than those manufactured with many chip types, can draw low DC power, and yet retain the ability to program for the waveform at the time of shipping of a radio in which programmable modem 20 is implemented, or even as the radio is ready to be utilized in a field application.

Furthermore, CMOS chip 66 can be graded at final test into chips which have all signal processing engines 22 working, and those which have useful subsets of processing engines 22 that are functional. Thus, CMOS chip 66 may be utilized in both low cost radio applications, with partial engine functionality, and in high end radio applications, with fully functional engines 22. In this way, the component yield can be improved and the cost of CMOS chip 66 can be reduced.

Figure 3:
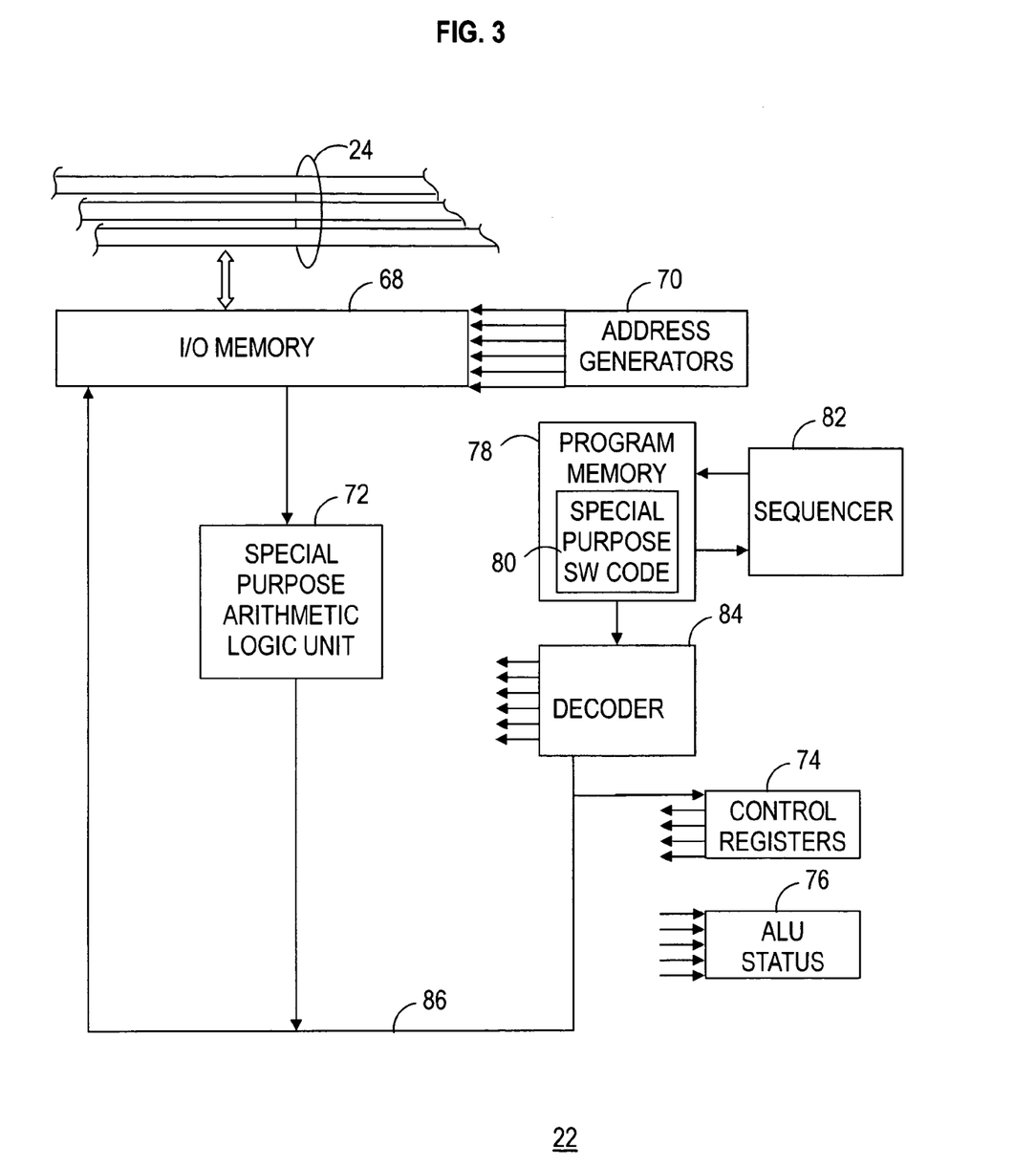
FIG. 3 shows a block diagram of a programmable signal processing engine of the programmable modem.

FIG. 3 shows a block diagram of a programmable signal processing engine 22 of programmable modem 20 (FIG. 1). In a preferred embodiment, engines 22 may be designed as special purpose signal processing engines that are highly flexible and perform their respective signal processing tasks efficiently. The block diagram of signal processing engine 22 is highly simplified and can be readily adapted for the specialized purposes of engines 22 discussed above.

In general, signal processing engine 22 includes engine I/O memory 68 in communication with bus system 24 of programmable modem 20. Signal processing engine further includes address generators 70, a special purpose arithmetic logic unit (ALU) 72, control registers 74, and an ALU status block 76. In addition, signal processing engine 22 includes a program memory 78 in which special purpose software code 80 is stored, an instruction sequencer 82, and an instruction decoder 84. A bus 86 interconnects engine I/O memory 68, address generators 70, special purpose ALU 72, control registers 74, an ALU status block 76, program memory 78, instruction sequencer 82, and instruction decoder 84.

Special purpose ALU 72 may be configured to efficiently implement a particular waveform signal process to process a portion of the waveform in response to execution of special purpose software code 80. Thus, engine I/O memory 68 in connection with special purpose ALU 72 may receive input signals, perform signal processing tasks in accordance with special purpose software code 80, and return output signals to other engines 22 via bus system 24.

In one embodiment, special purpose ALU 72 can be controlled by instruction sequencer 82, thereby allowing special purpose ALU 72 to be programmed to implement a particular range of functionality. As an example, special purpose ALU 72 can be programmed to implement filtering within filter engine 42 (FIG. 1), to synthesize a range of frequencies within NCO engine 44 (FIG. 1), to run large fast fourier transforms within FFT engine 46 (FIG. 1), or to perform some other specialized or generalized function for demodulating a waveform in real time. When signal processing engine 22 has completed execution of special purpose software code 80 to process a portion of the waveform, engine 22 returns results via bus system 24.

Figure 4:
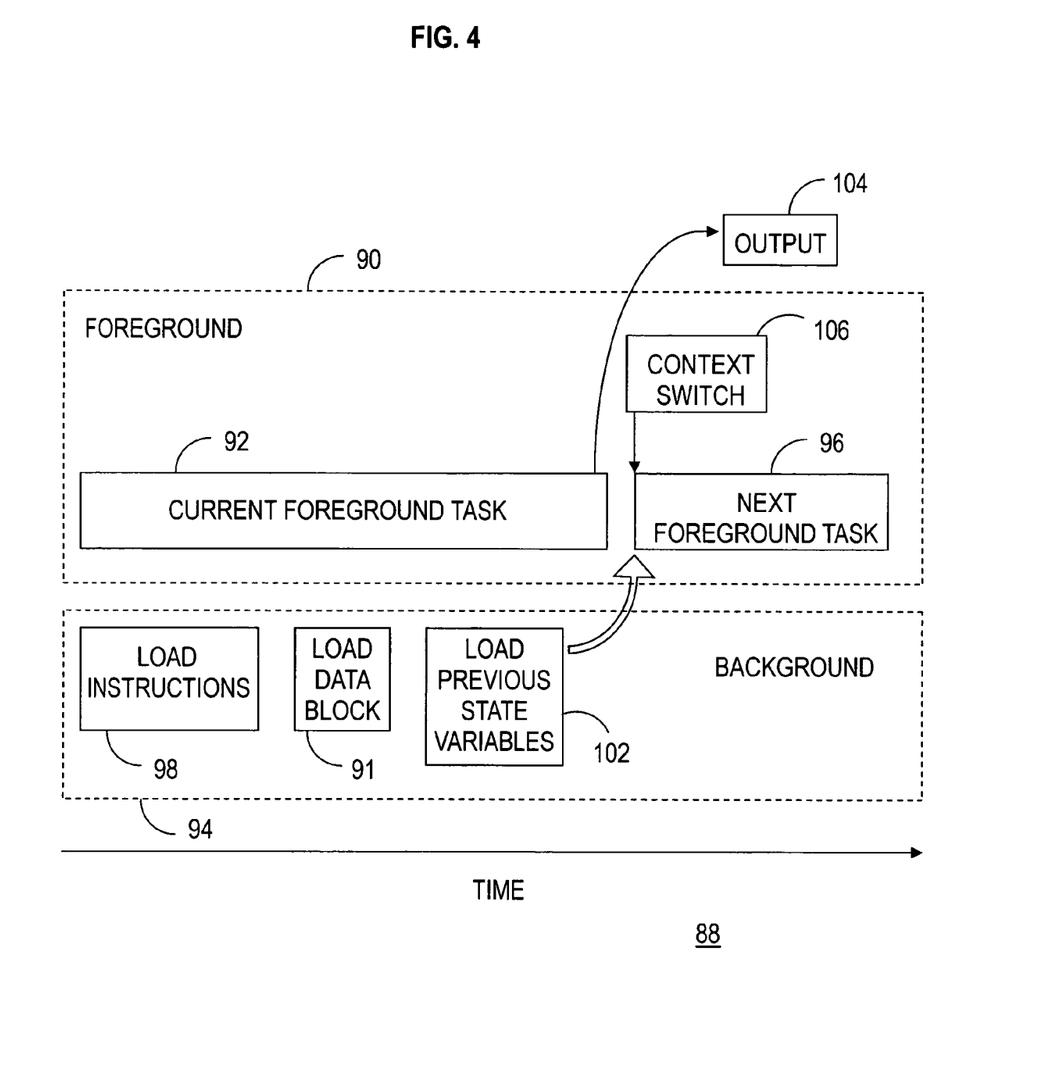
FIG. 4 shows a block diagram of a context switching process of the present invention.

FIG. 4 shows a block diagram of a context switching process 88 of the present invention. In a preferred embodiment, signal processing engines 22 (FIG. 1) may be configured to support context switching. In general, context switching is a multitasking process in which a computing system stops running one process and starts another.

As exemplified in context switching process 88, in a foreground environment 90, a current foreground task 92 is executed in one of signal processing engines 22 (FIG. 1) while the data and instructions for the next task are prepared in a background environment 94. When current foreground task 92 completes, the context is switched to enable the next task to become a next foreground task 96. The signal processing elements used with context switching process 88 for multitasking within one of engines 22 include, for example, a step 98 in which instructions for engine 22 in the next context are loaded. In a step 100, a data block for engine 22 in the next context is loaded, and in a next step 102, previous state variables for engine 22 in the next context are loaded. The results of current foreground task 92 may be output via a results output vector 104. Steps 98, 100, and 102 are followed by a context switch 106, which marks the beginning of next foreground task 96. Thus, engines 22 can switch context to rapidly perform a sequence of processes on multiple blocks of data.

Figure 5:
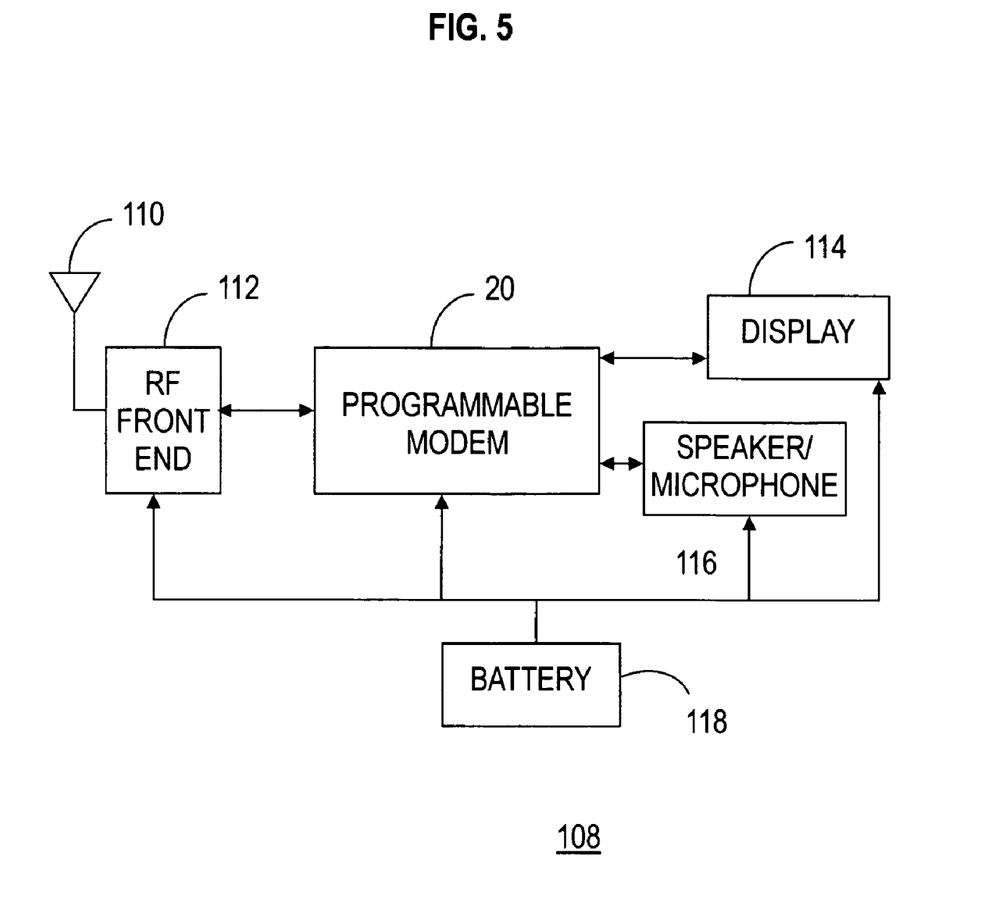
FIG. 5 shows a block diagram of a software defined radio that incorporates the programmable modem of the present invention.

FIG. 5 shows a block diagram of a software defined radio (SDR) 108 that incorporates programmable modem 20. As known to those skilled in the art, an SDR is a radio whose channel modulation waveforms are defined in the software. Waveforms for transmission are generated as sampled digital signals, converted from digital to analog, and optionally upconverted from an intermediate frequency to a radio frequency. For reception of signals, the receiver extracts, downconverts, and demodulates the channel waveform. An analog to digital converter converts the received signals to digital for subsequent processing.

SDR 108 generally includes an antenna 110 for receiving and transmitting signals and an analog radiofrequency (RF) front end 112 that boosts incoming RF signal strength and converts it to a constant frequency. Programmable modem 20 is in communication with RF front end 112. Programmable modem 20 converts a waveform from analog form to a digitized signal and vice versa, impresses the digital waveform onto an RF carrier for transmission, and/or separates the digital waveform from the RF carrier upon receipt. A display 114 and audio, for example, a speaker/microphone system 116 are in communication with programmable modem 20 for conventional visual display, conversion of the output of programmable modem 20 into sounds, and conversion of sounds into an electrical signal for input into programmable modem. For remote and/or portable applications, SDR 108 is powered via a battery 118.

By employing programmable modem 20 and implementing design changes via the software, the end-user can obtain a seamless transition between various waveforms, protocols, and bug fixes, so that the life cycle of SDR 108 can be greatly enhanced. In addition, the incorporation of programmable modem 20 on CMOS chip 66 (FIG. 3) into SDR 108 results in a lower power, smaller size, and lower cost software defined radio than radios using a collection of field programmable gate arrays, digital signal processors, and general purpose processors. Such an implementation may allow SDR 108 to be very cost effective.

In summary, the present invention teaches of a programmable modem that can process multiple waveforms under a variety of communications standards. The programmable modem implements a number of special purpose programmable signal processing engines that allow the programmable modem to operate with a high degree of parallelism so as to achieve high processing efficiency. In addition, the special purpose programmable engines are programmed with special purpose software programs containing particular algorithms that can be reprogrammed to reflect different communications standards, evolving waveform signal processes, and the like. As a consequence, a standardized radio platform can be manufactured, and can be configured to a specific application at the time of order by installing a little software. In addition, the single chip CMOS configuration of programmable modem achieves significant power savings through a power manager engine that selectively powers currently used signal processing engines. Reducing the load on the battery essentially extends battery life so that the programmable modem may be readily implemented in remote applications, such as wireless devices. Moreover, the single chip CMOS configuration of programmable modem has a smaller form factor, a lower power draw, and is less costly to manufacture than prior art devices that use a collection of chips.

Although the preferred embodiments of the invention have been illustrated and described in detail, it will be readily apparent to those skilled in the art that various modifications may be made therein without departing from the spirit of the invention or from the scope of the appended claims. For example, various modifications, such as the exclusion of some of the signal processing engines and/or the addition of signal processing engines not expressly listed can vary greatly from those described.

What is claimed is:

1. A programmable modem for processing a waveform comprising:
    a processor;
    programmable signal processing engines in communication with said processor, each of said signal processing engines being configured to execute a software program to process a portion of said waveform under one of a plurality of communication standards in response to control signals from said processor; and
    a power manager in communication with said processor and said programmable signal processing engines, said power manager responding to said control signals from said processor to selectively power ones of said programmable signal processing engines.

2. A programmable modem as claimed in claim 1 wherein said processor, said programmable signal processing engines, and said power manager are implemented on a single chip.

3. A programmable modem as claimed in claim 2 wherein said chip comprises a complementary metal-oxide-semiconductor (CMOS) integrated circuit.

4. A programmable modem as claimed in claim 1 wherein said processor comprises a general purpose processor.

5. A programmable modem as claimed in claim 1 wherein said processor is adapted to implement an instruction set, said instruction set defining a standard for performing sequencing of a plurality of said control signals.

6. A programmable modem as claimed in claim 1 wherein said each of said signal processing engines is configured to be context switched.

7. A programmable modem as claimed in claim 1 wherein said each of said signal processing engines comprises:
    an arithmetic logic unit for processing said portion of said waveform in response to execution of said software program; and
    engine memory in communication with said arithmetic logic unit for receiving input signals, performing processing tasks in accordance with said software program, and returning output signals.

8. A programmable modem as claimed in claim 1 wherein said each of said programmable signal processing engines is a special purpose programmable signal processing engine and said software program is a special purpose software program for implementing a particular waveform signal process.

9. A programmable modem as claimed in claim 8 wherein said special purpose programmable signal processing engine comprises a local memory for storing said special purpose software program.

10. A programmable modem as claimed in claim 1 wherein said power manager comprises means for providing power to currently used ones of said signal processing engines and discontinuing power to currently unused ones of said signal processing engines.

11. A programmable modem as claimed in claim 1 further comprising a bus system interconnecting each of said processor, said programmable signal processing engines, and said power manager, said bus system including a first bus for transmitting a first packet between said signal processing engines and a second bus for transmitting a second packet between said signal processing engines concurrent with transmission of said first packet.

12. A programmable modem as claimed in claim 1 wherein said programmable modem is incorporated into a software defined radio.

13. A programmable modem for processing a waveform comprising:
    a processor;
    special purpose programmable signal processing engines in communication with said processor, each of said signal processing engines being configured to execute a special purpose software program for implementing a particular waveform signal process to process a portion of said waveform under one of a plurality of communication standards in response to control signals from said processor; and
    a power manager in communication with said processor and said engines, said power manager including means for providing power to currently used ones of said engines and discontinuing power to currently unused ones of said engines in response to said control signals from said processor.

14. A programmable modem as claimed in claim 13 wherein said each of said engines is configured to be context switched.

15. A programmable modem as claimed in claim 13 wherein said each of said engines comprises:
    a specialized arithmetic logic unit for processing said portion of said waveform in response to execution of said special purpose software program; and
    engine memory in communication with said specialized arithmetic logic unit for receiving input signals, performing processing tasks in accordance with said software program, and returning output signals.

16. A programmable modem as claimed in claim 13 wherein said each of said special purpose programmable signal processing engines comprises a local memory for storing said special purpose software program.

17. A programmable modem as claimed in claim 13 further comprising a bus system interconnecting each of said processor, said engines, and said power manager, said bus system including a first bus for transmitting a first packet between said engines and a second bus for transmitting a second packet between said engines concurrent with transmission of said first packet.

18. A programmable modem for processing a waveform comprising:

a processor adapted to implement an instruction set defining a standard for performing sequencing of control signals;

programmable signal processing engines in communication with said processor, each of said signal processing engines being configured to execute a software program to process a portion of said waveform under one of a plurality of communication standards in response to said control signals from said processor; and a power manager in communication with said processor and said programmable signal processing engines, said power manager responding to said control signals from said processor to selectively power ones of said programmable signal processing engines, said processor, said programmable signal processing engines, and said power manager being implemented on a single complementary metal-oxide-semiconductor (CMOS) integrated circuit chip.

19. A programmable modem as claimed in claim 18 wherein said processor comprises a general purpose processor.

20. A programmable modem as claimed in claim 18 wherein said programmable modem is incorporated into a software defined radio.

* * * * *